United States Patent
Skiba et al.

(10) Patent No.: US 9,809,262 B2
(45) Date of Patent: Nov. 7, 2017

(54) CABLE ATTACHMENT ASSEMBLY FOR A SPARE WHEEL

(71) Applicant: Dura Operating, LLC, Auburn Hills, MI (US)

(72) Inventors: Stanislaw Skiba, Oxford, MI (US); John Sayeau, Oxford, MI (US)

(73) Assignee: DURA Operating, LLC, Auburn Hills, MI (US)

( * ) Notice: Subject to any disclaimer, the term of this patent is extended or adjusted under 35 U.S.C. 154(b) by 24 days.

(21) Appl. No.: 15/012,421

(22) Filed: Feb. 1, 2016

(65) Prior Publication Data

US 2017/0217509 A1   Aug. 3, 2017

(51) Int. Cl.
*B62D 43/00* (2006.01)
*B62D 43/04* (2006.01)

(52) U.S. Cl.
CPC .................................. *B62D 43/045* (2013.01)

(58) Field of Classification Search
CPC .... B62D 43/045; B62D 43/04; B62D 43/002; B62D 43/007
USPC ....................................................... 224/42.23
See application file for complete search history.

(56) References Cited

U.S. PATENT DOCUMENTS

| | | | | |
|---|---|---|---|---|
| 2,420,854 A * | 5/1947 | Black | .................. | B62D 43/002 224/42.23 |
| 3,175,742 A * | 3/1965 | Cadmus | ................. | B62D 43/04 224/42.23 |
| 3,724,731 A * | 4/1973 | Potgieter | .............. | B62D 43/002 224/42.23 |
| 4,282,995 A * | 8/1981 | Austin | ................... | B62D 43/04 224/42.23 |
| 4,794,771 A * | 1/1989 | Princell | ................ | B62D 43/045 224/42.23 |
| 5,638,710 A * | 6/1997 | Howard, Jr. | ......... | B62D 43/007 224/42.23 |
| 5,954,246 A * | 9/1999 | Golovoy | .............. | B62D 43/002 224/42.21 |
| 5,975,498 A * | 11/1999 | Sauner | ................. | B62D 43/045 224/42.23 |
| 6,267,546 B1 * | 7/2001 | Oxyer | .................. | B62D 43/045 254/323 |
| 6,435,479 B1 * | 8/2002 | Raz | ......................... | B66D 1/54 224/42.23 |
| 2013/0256344 A1 * | 10/2013 | Pulice | .................. | B62D 43/007 224/42.25 |

(Continued)

*Primary Examiner* — Peter Helvey
(74) *Attorney, Agent, or Firm* — Robert E. Ford; Steven L. Crane; Raymond J. Vivacqua

(57) ABSTRACT

An assembly for connecting a spare wheel to a motor vehicle with a tether, the spare wheel having at least one bolt hole, includes an eyelet bracket having a first member angled with respect to a second member, the first member connectable to the tether and the second member defining an eyelet, a rod that defines an axis and is connected to the first member, the rod configured to be disposed in the bolt hole of the spare wheel, and a clip connected to the second member, the clip having a retaining feature extended towards the rod and a tab extended through the eyelet. The second member of the eyelet bracket prevents the eyelet bracket from rotating about the axis and the retaining feature of the clip prevents the eyelet bracket from moving in one direction along the axis.

20 Claims, 3 Drawing Sheets

(56) References Cited

U.S. PATENT DOCUMENTS

2015/0098779 A1\* 4/2015 Otelli .................. B62D 43/045
                                                                                          414/463
2016/0129952 A1\* 5/2016 Farooq .................. B62D 43/04
                                                                                          224/42.23

\* cited by examiner

CABLE ATTACHMENT ASSEMBLY FOR A SPARE WHEEL

FIELD

The invention relates generally to an assembly for connecting a spare wheel to a motor vehicle with a cable, and more particularly an assembly that facilitates attachment and removal of the assembly to the spare wheel by restricting rotation and translation of the assembly when connected to the spare wheel.

BACKGROUND

The statements in this section merely provide background information related to the present disclosure and may or may not constitute prior art.

Many motor vehicles, including cars and trucks, carry a spare wheel somewhere on or in the motor vehicle. The spare wheel, which includes a tire mounted on a rim, is used to replace a wheel of the motor vehicle whose tire or rim has become damaged. In passenger cars, the spare wheel is oftentimes a temporary wheel having reduced size and mass which may be stored in a floor pan of the trunk of the passenger car. However, in larger vehicles, such as sport utility vehicles and trucks, the spare wheel has a greater size and weight. These larger spare wheels are oftentimes stored underneath the truck and lowered with a cable and winch system. However, due to the size and weight of these large spare wheels, a safety tether is used to couple the spare wheel to the frame of the motor vehicle.

While these safety tether systems are useful for their intended purpose, there is a constant need in the art for improved safety systems that facilitate the attachment and removal of the safety tether to the spare wheel.

SUMMARY

An assembly for connecting a spare wheel to a motor vehicle with a tether is provided. The spare wheel has at least one bolt hole. The assembly includes an eyelet bracket having a first member angled with respect to a second member, the first member connectable to the tether and the second member defining an eyelet, a rod that defines an axis and is connected to the first member, the rod configured to be disposed in the bolt hole of the spare wheel, and a clip connected to the second member, the clip having a retaining feature extended towards the rod and a tab extended through the eyelet. The second member of the eyelet bracket prevents the eyelet bracket from rotating about the axis and the retaining feature of the clip prevents the eyelet bracket from moving in one direction along the axis.

In one aspect of the assembly, the clip is movable between a first position and a second position, and the clip prevents the eyelet bracket from moving in the one direction along the axis when in the first position and does not prevent the eyelet bracket from moving in the one direction along the axis when in the second position.

In another aspect of the assembly, the clip includes a base portion connected to the second member and the retaining feature includes a first ramp portion and a first retaining portion, the first ramp portion disposed between the base portion and the retaining portion, and the first retaining portion configured to prevent the eyelet bracket from moving in the one direction along the axis.

In another aspect of the assembly, the first retaining portion contacts the spare wheel to prevent the eyelet bracket from moving in the one direction along the axis when the clip is in the first position.

In another aspect of the assembly, the clip is biased to the first position.

In another aspect of the assembly, the retaining feature includes a second ramp portion and a second retaining portion, the second ramp portion disposed between the first retaining portion and the second retaining portion, the second retaining portion disposed between the second ramp portion and the tab, and the second retaining portion configured to prevent the eyelet bracket from moving in the one direction along the axis.

In another aspect of the assembly, the clip is movable to a third position between the first and second positions, and the second retaining portion contacts the spare wheel to prevent the eyelet bracket from moving in the one direction along the axis when the clip is in the second position.

In another aspect of the assembly, from the axis of the rod, the second retaining portion is disposed radially outward of the first retaining portion.

In another aspect of the assembly, second member of the eyelet bracket is parallel to the axis of the rod.

In another aspect of the assembly, the second member of the eyelet bracket is adjacent the rod.

In another aspect of the assembly, the clip is connected to a distal end of the second member of the eyelet bracket.

In another aspect of the assembly, the rod and the clip extend from an inner surface of the eyelet bracket.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
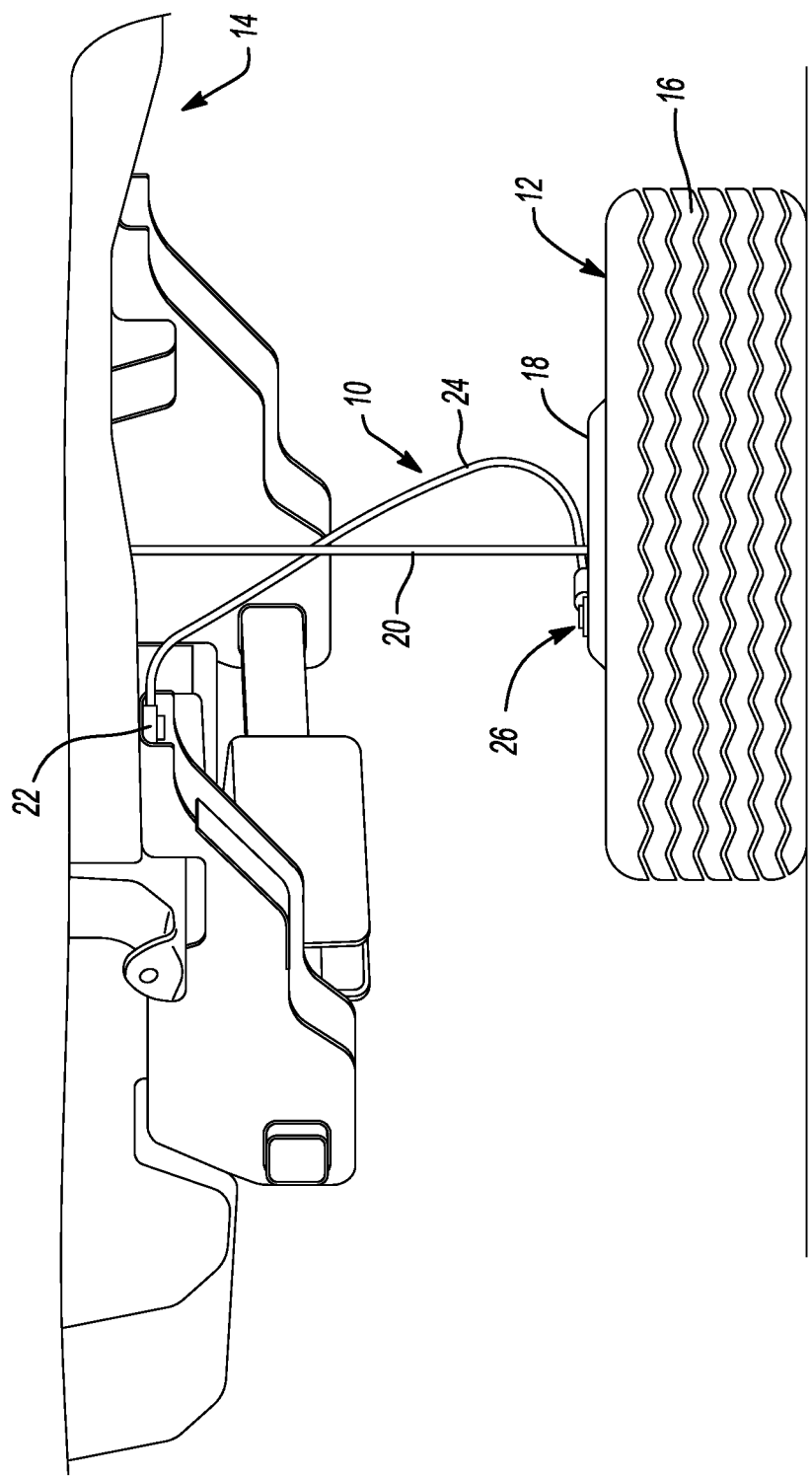
FIG. 1 is front perspective view of a cable attachment assembly used with an exemplary spare wheel and exemplary motor vehicle.

With reference to FIG. 1, a cable attachment assembly is generally indicated by reference number 10. The cable attachment assembly 10 is used to couple a spare wheel 12 to a motor vehicle 14. The spare wheel 12 generally includes a tire 16 mounted to a rim 18. The spare wheel 12 is preferably a full sized spare wheel 12 equivalent to the normal road wheels of the motor vehicle 14, though it should be appreciated that any spare wheel 12 may be used with the cable attachment assembly 10. The spare wheel 12 is connected to an underside of the motor vehicle 14 by a winch cable 20. A winch (not shown) connected to the winch cable 20 raises and lowers the spare wheel 12 as needed. The motor vehicle 14 is preferably a sport utility vehicle, a van, a truck, or any other motor vehicle that uses a full sized spare wheel 12. However, it should be appreciated that the cable attachment assembly 10 may be used with any type of motor vehicle, including passenger cars.

The cable attachment assembly 10 is a safety device used to connect the spare wheel 12 to the motor vehicle 14 in case of failure of the winch cable 20 or the winch mechanism itself. The cable attachment assembly 10 includes an eyelet 22, a cable or tether 24, and a connecting assembly 26. The eyelet 22 is connected, such as by a nut and bolt, to the motor vehicle 14. The cable 24 connects the eyelet 22 to the connecting assembly 26. The cable 24 is preferably made of a suitable material, such as woven steel wires, so as to support the weight of the spare wheel 12.

Figure 2:
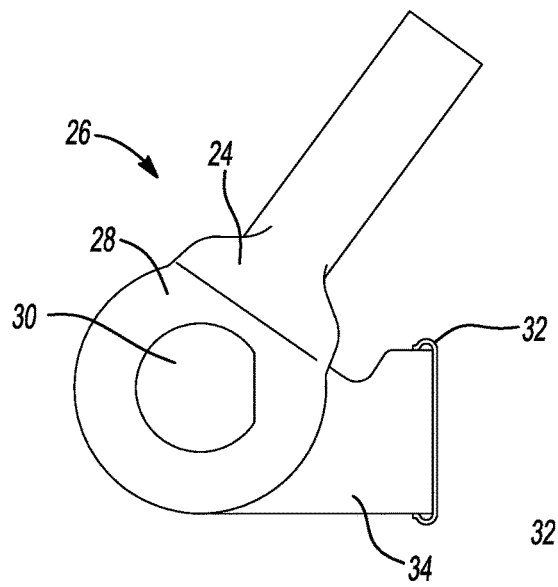
FIG. 2 is a top view of a connecting assembly.
Figure 3:
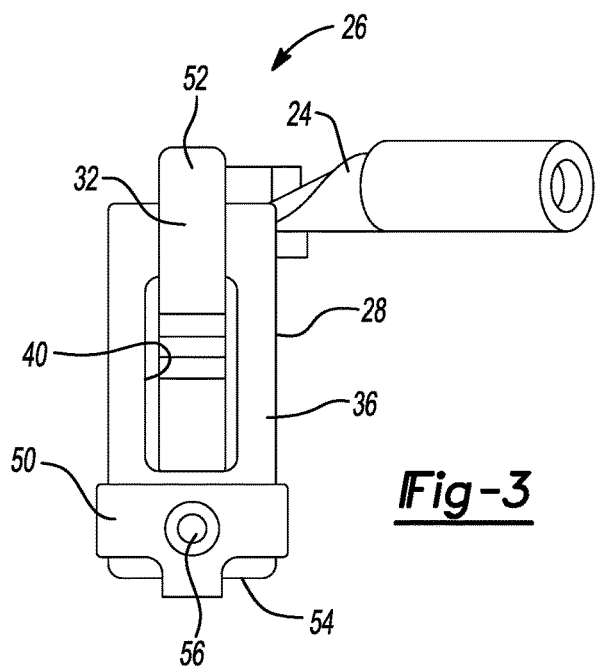
FIG. 3 is a first side view of the connecting assembly.
Figure 4:
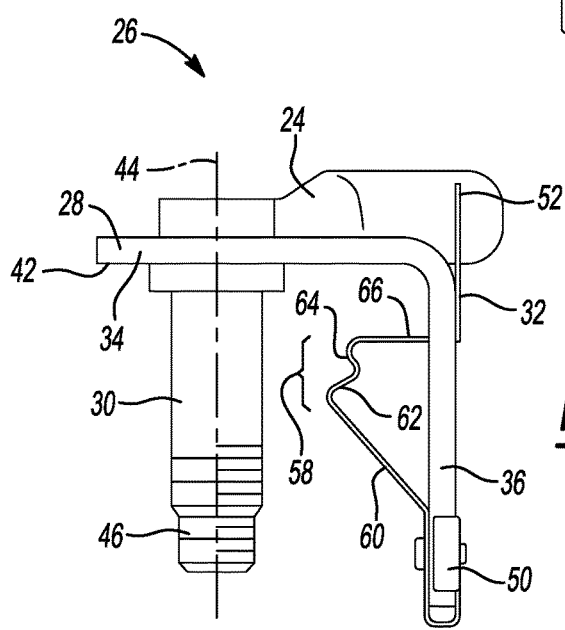
FIG. 4 is a second side view of the connecting assembly.

Turning to FIGS. 2-4 and with continued reference to FIG. 1, the connecting assembly 26 is used to connect the cable attachment assembly 10 to the spare wheel 12. The connecting assembly 26 includes an eyelet bracket 28, a rod or bolt 30, and a spring clip 32. The eyelet bracket 28 is generally L-shaped and includes a first member 34 and a second member 36. The first member 34 is angled with respect to the second member 36 at approximately 90 degrees. The first member 34 is connected to the cable 24. The second member 36 defines an eyelet or window 40.

The rod or bolt 30 is connected to the first member 34 and extends out from an inner surface 42 of the first member 34. The rod 30 defines an axis 44 that is parallel to the second member 36. The rod 30 may include a thread end or cross thread preventing feature 46.

The clip 32 is a spring that moves between a first position, shown in FIGS. 2-5 and a second position where the clip 32 is bending due to contact by the rim 18 as the connecting assembly 26 is inserted into the rim 18. In an alternate example using a different style and type of rim 18, the clip 32 is movable to a third position (shown in FIG. 6) and which will be described in greater detail below. The clip 32 has a first end or base portion 50 and a second end or tab 52. The base portion 50 is connected to a distal end 54 of the second member 36. In the example provided the base portion 50 is connected to the second member 36 by a rivet 56, though various other types of connections may be employed. The clip 32 bends about the base portion 50 while the tab 52 is free to move.

The clip 32 also includes a retaining feature 58 disposed between the base portion 50 and the tab 52. The retaining feature 58 extends towards the rod 30 and the tab 52 extends through the eyelet 40 of the second member 36 such that the tab 52 is disposed on an opposite side of the second member 36 than the retaining feature 58.

The retaining feature 58 is configured to engage or contact various types and sizes of rims 18 of the spare wheel 12 in order to retain the connecting assembly 26 on the spare wheel 12. For example, the retaining feature 58 includes a first ramp portion 60 that extends out from the base portion 50, a first retaining portion 62 connected to the first ramp portion 60, a second ramp portion 64 connected to the first retaining portion 62, and a second retaining portion 66 connected to the second ramp portion 64 and to the tab 52. The ramp portions 60 and 64 are substantially co-planar and facilitate moving the clip 32 from the first position to the second position as the connecting assembly 26 is attached to the rim 18. The retaining portions 62 and 66 are substantially co-planar and angled with respect to the ramp portions 60 and 64. Thus, the retaining portions 62 and 66 retain the connecting assembly 26 on the rim 18 of the spare wheel 12. Each retaining portion 62, 66 is configured to interact with a different sized rim 18. Therefore, from the axis 44 of the rod 30, the second retaining portion 64 is disposed radially outward of the first retaining portion 62.

Figure 5:
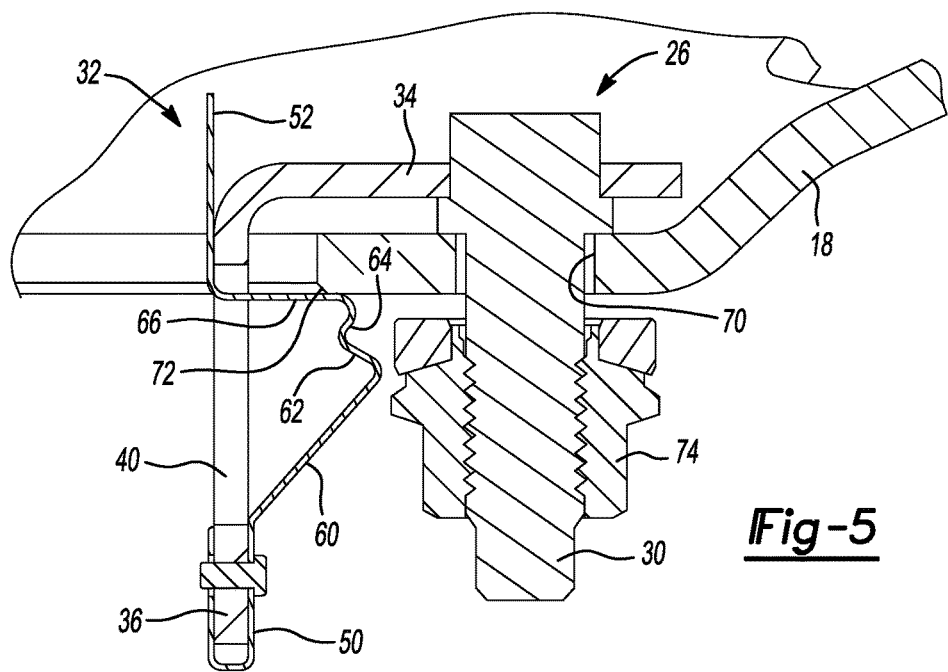
FIG. 5 is a cross-sectional view of the connecting assembly installed on a spare wheel.

Turning now to FIG. 5, and with continued reference to FIGS. 1-4, to connect the cable attachment assembly 10 to the spare wheel 12, the rod 30 of the connecting assembly 26 is inserted into a bolt hole 70 disposed in the rim 18. As the rod 30 is inserted, an inner edge 72 of the rim 18 slides along the first ramp portion 60, bending the clip 32 to the second position until such time as the inner edge 72 passes beyond the second retaining portion 66 and the clip 32 snaps back into the first position. In the first position, the clip 32 prevents the connecting assembly 34 from moving along the axis 44 of the rod 30, thus keeping the connecting assembly 26 on the rim 18. A nut 74 may then be screwed onto the rod 30. The second member 26, which extends through the center of the spare wheel 12, contacts the inner edge 72 and prevents the connecting assembly 26 from rotating about the axis 44 of the rod 30. Therefore, a user of the cable attachment assembly 10 may attach the spare wheel 12 to the connecting assembly 26 without having to work on both sides of the rim 18 since the connecting assembly 26 is prevented from rotating and being pushed out of the bolt hole 70 by the second member 36 and the clip 32, respectively. This is especially advantageous with larger spare wheel 12 commonly used in vans, SUV's, and trucks. To remove the cable attachment assembly 10, the nut 74 is removed and a user moves the tab 52 away from the inner edge 72 of the rim 18 thus allowing the connecting assembly 26 to translate along the axis 44.

Figure 6:
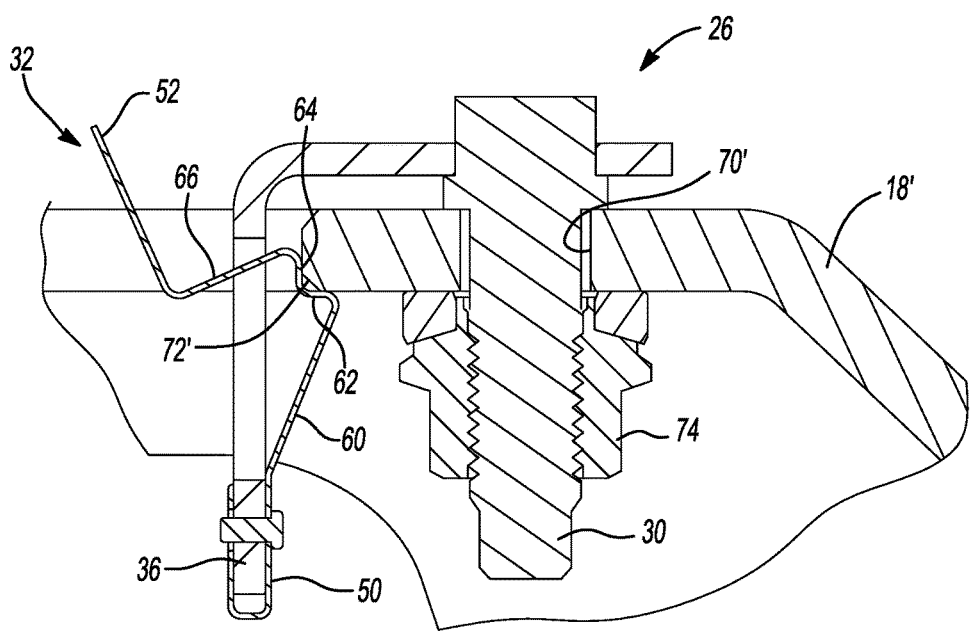
FIG. 6 is a cross-sectional view of the connecting assembly installed on another spare wheel.

Turning now to FIG. 6, the connecting assembly 26 is shown with a different rim, indicated by reference number 18'. The rim 18' is thicker than the rim 18. In this configuration, to connect the cable attachment assembly 10 to the spare wheel 12, the rod 30 of the connecting assembly 26 is inserted into a bolt hole 70' disposed in the rim 18'. As the rod 30 is inserted, an inner edge 72' of the rim 18' slides along the first ramp portion 60, bending the clip 32 to the second position until such time as the inner edge 72 passes beyond the first retaining portion 62 and the clip 32 snaps into the third position. In the third position, the first retaining portion 62 of the clip 32 prevents the connecting assembly 26 from moving along the axis 44 of the rod 30, thus keeping the connecting assembly 26 on the rim 18'. The nut 74 may then be screwed onto the rod 30. The second member 36, which extends through the center of the spare wheel 12, contacts the inner edge 72' and prevents the connecting assembly 26 from rotating about the axis 44 of the rod 30. Therefore, a user of the cable attachment assembly 10 may attach the spare wheel 12 to the connecting assembly 26 without having to work on both sides of the rim 18' since the connecting assembly 26 is prevented from rotating and being pushed out of the bolt hole 70 by the second member 36 and the clip 32, respectively. To remove the cable attachment assembly 10, the bolt 74 is removed and a user moves the tab 52 away from the inner edge 72' of the rim 18' thus allowing the connecting assembly 26 to translate along the axis 44. It should be appreciated that the clip 32 may include additional ramp and retaining portions to accommodate additional rims.

The description of the invention is merely exemplary in nature and variations that do not depart from the gist of the invention are intended to be within the scope of the invention. Such variations are not to be regarded as a departure from the spirit and scope of the invention.

The invention claimed is:

1. An assembly for connecting a spare wheel to a motor vehicle with a tether, the spare wheel having at least one bolt hole, the assembly comprising:
   an eyelet bracket having a first member angled with respect to a second member, the first member connectable to the tether and the second member defining an eyelet;
   a rod that defines an axis and is connected to the first member, the rod configured to be disposed in the bolt hole of the spare wheel; and
   a clip connected to the second member, the clip having a retaining feature extended towards the rod and a tab extended through the eyelet,
   wherein the second member of the eyelet bracket prevents the eyelet bracket from rotating about the axis and the retaining feature of the clip prevents the eyelet bracket from moving in one direction along the axis.

2. The assembly of claim 1 wherein the clip is moveable between a first position and a second position, and wherein the clip prevents the eyelet bracket from moving in the one direction along the axis when in the first position and does not prevent the eyelet bracket from moving in the one direction along the axis when in the second position.

3. The assembly of claim 2 wherein the clip includes a base portion connected to the second member and the retaining feature includes a first ramp portion and a first retaining portion, the first ramp portion disposed between the base portion and the retaining portion, and the first retaining portion configured to prevent the eyelet bracket from moving in the one direction along the axis.

4. The assembly of claim 3 wherein the first retaining portion contacts the spare wheel to prevent the eyelet bracket from moving in the one direction along the axis when the clip is in the first position.

5. The assembly of claim 4 wherein the clip is biased to the first position.

6. The assembly of claim 4 wherein the retaining feature includes a second ramp portion and a second retaining portion, the second ramp portion disposed between the first retaining portion and the second retaining portion, the second retaining portion disposed between the second ramp portion and the tab, and the second retaining portion configured to prevent the eyelet bracket from moving in the one direction along the axis.

7. The assembly of claim 6 wherein the clip is moveable to a third position between the first and second positions, and the second retaining portion contacts the spare wheel to prevent the eyelet bracket from moving in the one direction along the axis when the clip is in the second position.

8. The assembly of claim 7 wherein, from the axis of the rod, the second retaining portion is disposed radially outward of the first retaining portion.

9. The assembly of claim 1 wherein the second member of the eyelet bracket is parallel to the axis of the rod.

10. The assembly of claim 9 wherein the second member of the eyelet bracket is adjacent the rod.

11. The assembly of claim 1 wherein the clip is connected to a distal end of the second member of the eyelet bracket.

12. The assembly of claim 1 wherein the rod and the clip extend from an inner surface of the eyelet bracket.

13. An assembly for connecting a spare wheel to a motor vehicle, the spare wheel having a tire mounted on a rim, the rim having at least one bolt hole, the assembly comprising:
   a tether connectable to the motor vehicle;
   an eyelet bracket having a first member and a second member, the first member connected to the tether and the second member defining an eyelet;
   a rod that defines an axis and is connected to the first member, the rod configured to be disposed in the bolt hole of the spare wheel; and
   a clip connected to the second member, the clip having a tab extended through the eyelet and a retaining feature configured to contact the rim adjacent the bolt hole, wherein the clip is movable between at least a first position and a second position, wherein when the rod is disposed in the bolt hole, the retaining feature prevents the eyelet bracket from moving in an axial direction when in the first position and the retaining feature does not prevent the eyelet bracket from moving in the axial direction when in the second position.

14. The assembly of claim 13 wherein the second member of the eyelet bracket contacts the rim of the spare wheel when the rod is disposed in the bolt hole to prevent the eyelet bracket from rotating about the axis.

15. The assembly of claim 13 wherein the eyelet bracket includes a first side and a second side, and wherein the rod is disposed on the first side, the clip is connected to the eyelet bracket on the first side and extends through the eyelet to the second side, and the tether is connected to the eyelet bracket on the second side.

16. The assembly of claim 13 wherein the clip includes a base portion connected to the second member and the retaining feature includes a first ramp portion and a first retaining portion, the first ramp portion disposed between the base portion and the retaining portion, and the first retaining portion contacts the rim of the spare wheel to prevent the eyelet bracket from moving in the axial direction when the rod is disposed in the bolt hole and the clip is in the first position.

17. The assembly of claim 16 wherein the clip is moveable to a third position between the first and second positions, and the retaining feature includes a second ramp portion and a second retaining portion, the second ramp portion disposed between the first retaining portion and the second retaining portion, the second retaining portion disposed between the second ramp portion and the tab, and the second retaining portion configured to prevent the eyelet bracket from moving in the axial direction when the rod is disposed in the bolt hole and the clip is in the third position.

18. The assembly of claim 13 wherein the clip is biased to the first position.

19. An assembly for a motor vehicle comprising:
   a wheel having a tire mounted on a rim, the rim having at least one bolt hole;
   a tether connectable to the motor vehicle;
   an eyelet bracket having a first member and a second member, the first member connected to the tether and the second member defining an eyelet;
   a rod that defines an axis and is connected to the first member, the rod disposed in the bolt hole of the spare wheel; and
   a clip connected to the second member, the clip having a ramp portion, a tab extended through the eyelet, and a retaining portion disposed between the ramp portion and the tab, wherein the clip is movable between at least a first position and a second position by the rim acting on the ramp portion or by an operator of the motor vehicle using the tab, and
   wherein the second member contacts the rim to prevent the eyelet from rotating about the axis and the retaining portion prevents the eyelet bracket from moving in an axial direction when the clip is in the first position and the retaining portion does not prevent the eyelet bracket from moving in the axial direction when the clip is in the second position.

20. The assembly of claim 19 wherein the clip includes a plurality of alternating ramp portions and retaining portions to accommodate rims of different sizes.

\* \* \* \* \*